United States Patent
Wang et al.

(10) Patent No.: US 7,433,539 B2
(45) Date of Patent: Oct. 7, 2008

(54) METHOD FOR RUN-TIME STREAK REMOVAL

(75) Inventors: Shen-Ge Wang, Fairport, NY (US); Zhigang Fan, Webster, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 641 days.

(21) Appl. No.: 10/993,852

(22) Filed: Nov. 19, 2004

(65) Prior Publication Data

US 2006/0110060 A1    May 25, 2006

(51) Int. Cl.
*G06K 9/40* (2006.01)
*G06K 9/32* (2006.01)
(52) U.S. Cl. .................... 382/275; 382/300; 382/260
(58) Field of Classification Search .............. 382/275, 382/300, 260–266
See application file for complete search history.

(56) References Cited

U.S. PATENT DOCUMENTS 7,200,286 B2 * 4/2007 Matsumoto ............. 382/300

OTHER PUBLICATIONS

U.S. Appl. No. 10/845,146, filed May 14, 2004 to S. Schweid, et al. for "Systems and Methods for Streak Detection in Image Array Scanning Overdetermined Scanners and Column Filtering".

* cited by examiner

*Primary Examiner*—Matthew C. Bella
*Assistant Examiner*—Wesley Tucker
(74) *Attorney, Agent, or Firm*—Jeannette Walder

(57) ABSTRACT

A method for run-time streak removal from a scanned image includes providing a scan line of image data from the scanned image; detecting corrupted data within the scan line; evaluating image data located in a neighborhood before and after the corrupted data on the scan line; if the evaluated image data in the neighborhood is smooth, replacing the corrupted data with image data determined by a linear interpolation process; and else if the evaluated image data in the neighborhood is not smooth, replacing the corrupted data with image data determined by the linear prediction process. Various techniques can be used to evaluate the image data located in the surrounding neighborhood. For example, a filter selection step may be used based on prediction discrepancies.

10 Claims, 4 Drawing Sheets

METHOD FOR RUN-TIME STREAK REMOVAL

CROSS-REFERENCE TO RELATED APPLICATIONS

This application is related to co-assigned U.S. patent application Ser. No. 10/992,865 to S. Wang for Method for Run-Time Streak Detection by Profile Analysis, filed the same date hereof, the contents of which are incorporated herein in its entirety and made a part hereof. This application is also related to co-pending, co-assigned U.S. patent application Ser. No. 10/845,164 filed May 14, 2004 to S. Schweid et al. for Systems and Methods for Streak Detection in Image Array Scanning Overdetermined Scanners and Column Filtering, the contents of which are incorporated herein in its entirety and made a part hereof.

BACKGROUND

This disclosure relates generally to methods for run-time streak removal from scanned images.

A main drawback of paper-fed scanners, such as CVT (Constant Velocity Transfer) scanners, is their vulnerability to streak defects. Because the sensors equipped in such scanners are open to the environment, extraneous dirt, such as paper fibers, may cover or partially cover some of the sensor elements and stick there for a short time or as long as scanning several pages. As a result, streaks, formed as straight thin lines, will appear on the images of scanned documents in various lengths. A standard technique for removal of such streaks and other artifacts caused by dirt on the sensors and platen is to use a post-scanning process to search any streaks and artifacts and remove them correspondingly. This technique can be time consuming and resource inefficient. For example, a scanner may not be equipped with enough memory to store the entire scanned image, so it is necessary to save and recall the image from disk for the post-scanning process.

D/A3408 and D/A3639 describe two techniques for run-time streak detection: D/A3408 uses a four-sensor array and D/A3639 describes a software-based detection method. Both methods do not require a full-image buffer and can be used at run time scanning with only a one scan line image buffer. In most cases, for run-time streak detection, only one scan line of image information is available at a time. Thus, incorporated with run-time streak detection, run-time streak removal becomes a one-dimensional process, i.e., streak removal involves replacing the corrupted data in the "gap" of the streak by using data from left and right neighborhoods around the "gap".

Once a streak defect is detected in a scanned document, the next task is to replace it with "correct data". Replacing corrupted data involves guessing what the actual data should have been, based on neighboring data. The most common approach is linear interpolation and works very well for streak removal from images with smooth backgrounds. However, if the left and right neighborhoods of a streak have a textured background, such as found in halftone structures, linear interpolation does not provide a satisfactory result. It would be desirable to have a run-time streak removal method to accompanying these streak detection methods as well as others. It would be desirable to have run time streak removal method remove streaks from textured backgrounds with satisfactory results.

SUMMARY

A method for run-time streak removal from a scanned image, according to one embodiment, includes providing a scan line of image data from the scanned image; detecting corrupted data within the scan line; evaluating image data located in a neighborhood before and after the corrupted data on the scan line; if the evaluated image data in the neighborhood is smooth, replacing the corrupted data with image data determined by a linear interpolation process; and else if the evaluated image data in the neighborhood is not smooth, replacing the corrupted data with image data determined by the linear prediction process. Various techniques can be used to evaluate the image data located in the surrounding neighborhood, for example, a filter selection process may be used to determine whether linear prediction for streak removal is needed, as well as for selecting optimal parameters used in the linear prediction process. In one embodiment, the filter selecting process includes filtering image data from the neighborhood to obtain an image output signal; determining an error signal between the image output signal and a desired output signal; if the error signal is less than a predetermined value, the neighborhood is substantially smooth; and if the error signal is greater than or equal to the predetermined value, the neighborhood is not substantially smooth.

The method may be applied to systems in which more than a single scan line of image data may be stored. In some applications, it may be useful to evaluate image data from a two-dimensional neighborhood around the corrupted data. A method for run-time streak removal from a scanned image, according to another embodiment, includes providing a portion of image data from the scanned image; detecting corrupted data within the provided portion; evaluating image data located in a neighborhood surrounding the corrupted data in the provided portion; if the evaluated image data in the neighborhood is smooth, replacing the corrupted data with image data determined by a linear interpolation process; and else if the evaluated image data in the neighborhood is not smooth, replacing the corrupted data with image data determined by the linear prediction process.

The methods described for run-time streak removal can be used to complement run-time streak detection methods described in D/A3408 and D/A3639. The method, in one embodiment, uses one-line information of the scanned image to correct, or replace, the corrupted data by the streak. The method selects different corrections for different neighborhood backgrounds. If the background is smooth, a simple linear interpolation will be used; for other cases, a linear prediction process will be applied for an optimal replacement. Experiments conducted for testing the proposed streak removal method demonstrate much improved image quality of the recovered images, especially for scanned halftone images with crossed streaks. Using filter selection as a pre-operation to streak removal creates strong speed improvements without negative quality impacts.

DETAILED DESCRIPTION

Figure 1:
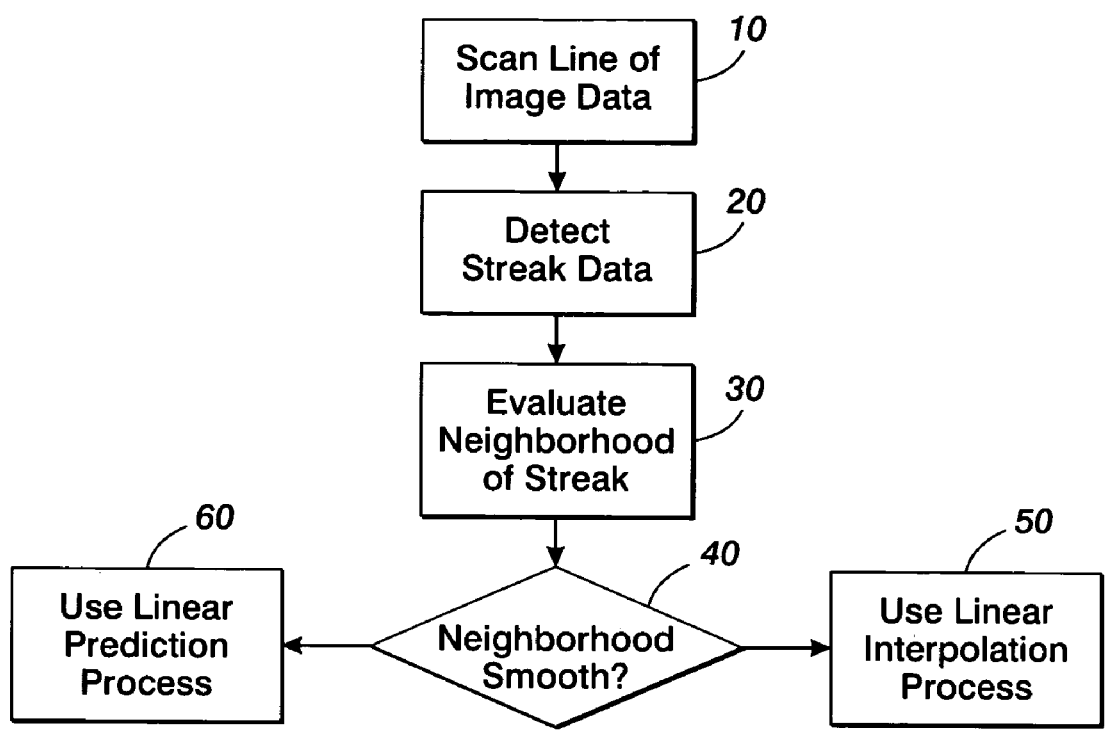
FIG. 1 is a block diagram of a method for run-time streak removal.

A method for run-time streak removal, according to one embodiment, is shown in FIG. 1. In step 10 a scan line of image data is provided. In step 20, streak data is detected using an appropriate method (such as the method described in Ser. Nos. 10/845,164 and 10/992,286). In step 30 a neighborhood of image data surrounding the corrupted data is evaluated. In the case of a scan line of data, the neighborhood includes a region to the right and left of the corrupted data. For a two dimensional analysis, the neighborhood would include data in adjacent scan lines. In step 40, the neighborhood is tested to determine if it is smooth or not smooth. If smooth, in step 50, a linear interpolation process is used to determine the attributes of the replacement data to fill in the gap caused by the streak. If the neighborhood is determined not to be smooth enough for the linear interpolation method, in step 60 a linear prediction process is used.

In the following, the method will be described with respect to a system employing a single scan line of image data. Since the image information is limited to one scan line at the time for streak removal, a correction, or replacement, of the corrupted data in the "gap" of the streak depends on data in its neighborhoods, left and right. The most common approach of such problem is using linear interpolation. Assume that a scanned image in the one-line buffer is represented by G(i), where i is the coordinate of the line, and a streak is detected by a detection routine so that the image data from $i_1$ to $i_2$ are corrupted. A simple linear interpolation method uses the immediate neighborhoods of the streak gap, $G(i_1-1)$ from the left and $G(i_2+1)$ from the right, to replace all corrupted image data G(i), $i_1 \leq I \leq i_2$, by $\tilde{G}$, where $$\tilde{G} = G(i_1 - 1) + \frac{(i - i_1 + 1)}{(i_2 - i_1 + 2)} * [G(i_2 + 1) - G(i_1 - 1)] \quad (1)$$

Figure 2:
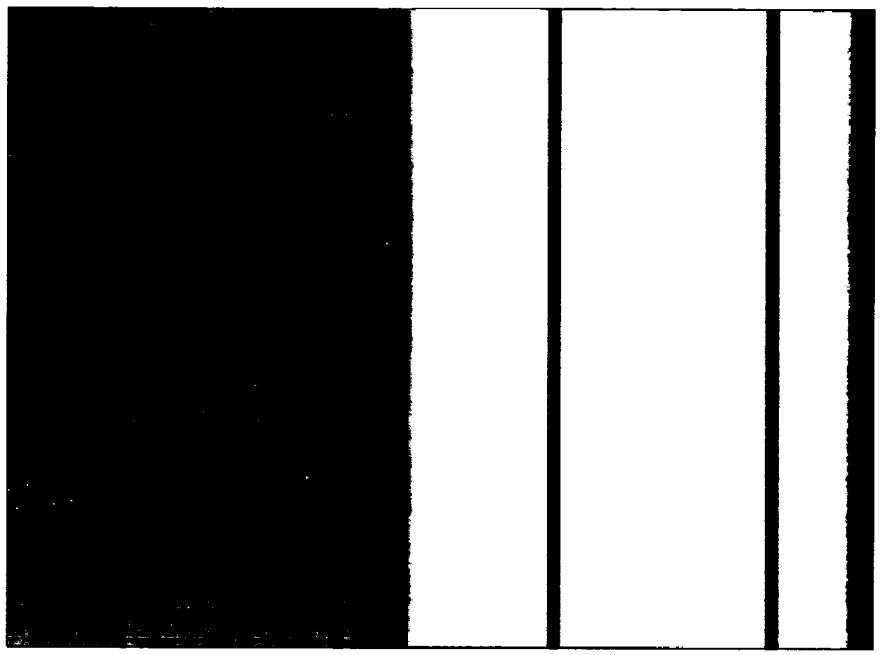
FIG. 2 is a scanned image with four artificially created black streaks.
Figure 3:
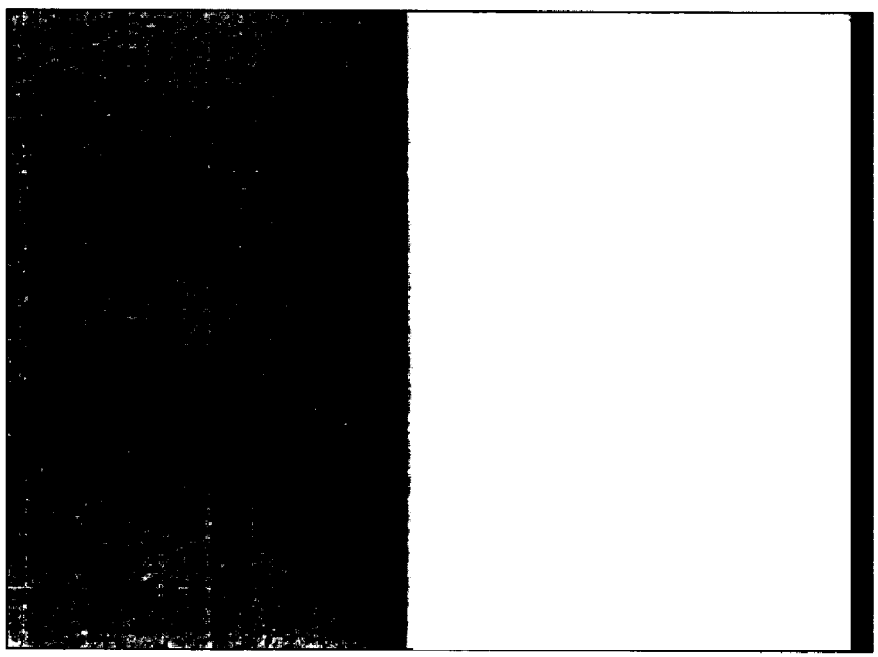
FIG. 3 illustrates removal of the streaks in FIG. 1 by linear interpolation.

The linear interpolation above works very well for streaks detected in areas with smooth backgrounds. For example, FIG. 2 is a scanned RGB image with four artificially created black streaks. All streaks indicated by the black pixels in FIG. 2 are corrected, line by line, by the linear interpolation relationship described in Equation (1). The result, shown in FIG. 3, is near perfect. However, if the streaks appear across a texture background, such as the halftone image shown in FIG. 4, the correction by a linear interpolation, shown in FIG. 5, usually can not provide a satisfactory result. Notice in FIG. 5 that there are a telltale stripes where the black streaks were previously located.

Although more complicated linear interpolation methods can be used than the one shown in Equation (1), e.g., more neighborhood points and higher order polynomials can be used, the gain is quite limited. The main reason of the failure in such circumstances is that the halftone textures possess very high spatial frequencies, which are close to the sampling frequency of the scanner, and linear interpolation methods do not work well for such rapidly oscillating functions.

Linear prediction offers better quality for streak removal than linear interpolation. This quality, however, comes at the expense of computation time, which might be an issue in real time systems, such as CVT scanners. In general, it can be said that Image Quality (IQ) using linear prediction is greater than or equal to Image Quality using linear interpolation. However, processing time for linear prediction is very much greater than processing time for linear interpolation:

IQ(linear prediction)≧IQ(linear interpolation) and
Processing Time(linear prediction)>>Processing Time (linear interpolation).

Figure 4:
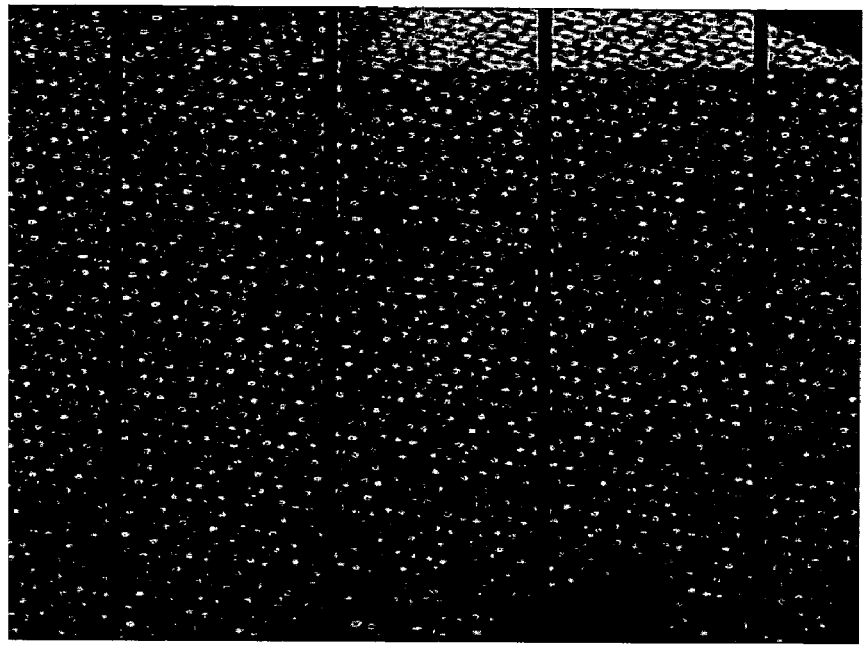
FIG. 4 illustrates a scanned halftone image with four artificial streaks.
Figure 5:
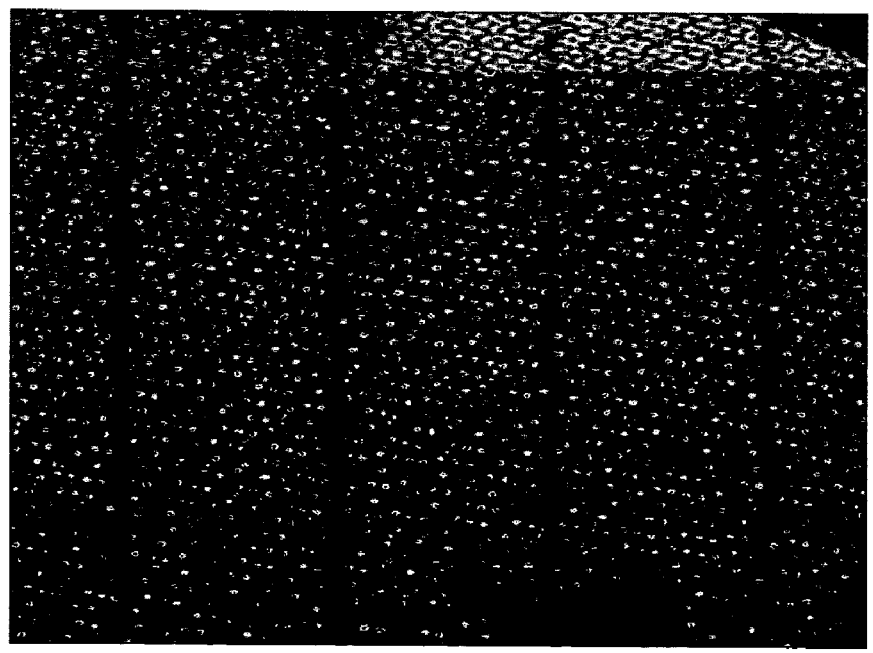
FIG. 5 illustrates removal of the streaks in FIG. 4 by linear interpolation.

This means that in situations where linear interpolation results in sufficient quality (see FIGS. 2 and 3) it is preferred over the much slower linear prediction, whereas in other cases the higher quality is needed (see FIG. 4). The linear prediction used here is described in many references on signal processing, such as the book, "Modern Spectrum Analysis", Childers, D. G. (ed.) 1978, New York, IEEE Press.

As the goal of a classical linear prediction, we use M consecutive equally spaced values of the scanned image G(i), where I=1, 2, ... M, to predict an M+1st value, G(M+1). Let's give a brief description of our approach to linear prediction. First, we assume the scanned pattern near the streak is spatially invariant. That is, the autocorrelation <(G(j)G(k)> is assumed to depend only on the difference |j−k|, and not on j or k individually, so that the autocorrelation $\phi_-$ has only a single index, $$\phi_j \equiv \langle (G(i)G(I + j) \rangle \approx \frac{1}{N - j} \sum_{i=1}^{N-j} G(i)G(i + j) \quad (2)$$

Here, the approximate equality shows how to use the actual limited data set values to estimate the autocorrelation components. A set of M linear prediction coefficients, $d_j$, can be attained from the set of M equations, $$\sum_{j=1}^{M} \phi_{|j-k|} d_j = \phi_k \quad (k = 1, \dots, M) \quad (3)$$

Once the $d_j$'s are calculated by using Equations (2) and (3), the M+1st value can be estimated by the following estimation equation from M consecutive scanned values:

$$\tilde{G}(n) = \sum_{j=1}^{M} d_j G(n - j) \quad (4)$$

We can apply Equation (4) again to estimate the M+2nd value, assuming the estimation of the M+1st value is reliable, and continue until all corrupted data are corrected. For most detected streaks, the prediction can be based on data from either side of the streak, left or right, as well as a combined result from both sides. In case there is a significant discrepancy between the predictions from left and from right, which might happen when crossing a boundary of different backgrounds, we may chose the prediction that yields the least prediction error.

The order M, or the number of coefficients, and the extension N, or the total number of neighborhoods used in equation (2), are optional. Since scanned values are always well bounded and the estimation by Equation (4) should be bounded into the same dynamic range, no "blowing-up" needs to be concerned in this application. However, the choice of M and N deeply affects the amount of computation involved and it is one of the reasons to have pre-filtering as a step in this method.

Figure 6:
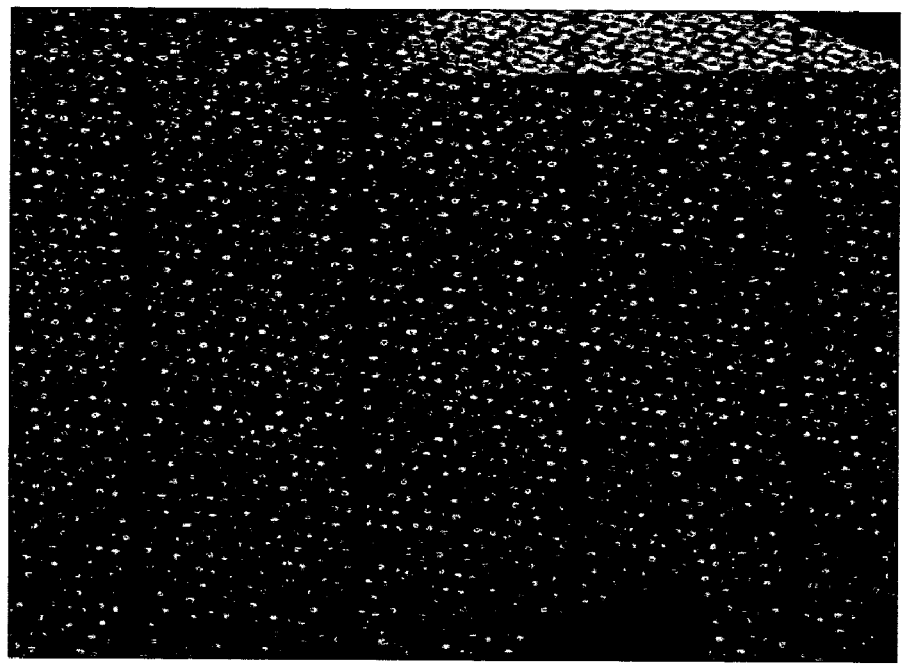
FIG. 6 illustrates removal of the streaks in FIG. 4 by linear prediction.

Since linear prediction is based on autocorrelations of the known records, it works much better than other methods for streak removal, especially for a case with a texture background, which shows rapid oscillation in a relative short interval. Using the same picture, FIG. 4, with four artificially created streaks, the correction by the linear prediction described above, shown in FIG. 6, is far superior to the one by a linear interpolation in FIG. 5.

Speed Improvements Through Filter Selection. There are several reasons to apply filter selection as a preprocessing step. Although linear prediction provides a superior image quality in streak correction, it is much more complicated than a simple linear interpolation and thus more time consuming. On the other hand, if the streak happens in a smooth area, most likely with a clean paper background, there is no need to use anything more than replacing the corrupted data by the value of an immediate neighbor. So, the first test of the evaluation process (in this case filter selection) is to determine if the neighborhood of the streak is smooth enough to apply a simple streak correction routine and skip all rest of the tests, thereby experiencing the time penalty only in those scan regions where a image quality gain can be obtained using linear prediction.

The second test is to determine if the neighborhood near the streak is spatially invariant. The proposed linear prediction method works under the assumption that the scanned image, or the section of the current scan line near the streak, is space invariant. If it is too far from an invariant case, it might be better just to use a simpler interpolation method.

The third test is to determine if the streak happens right on the boundary of two different backgrounds, say the edge of a halftone image. In this situation, the prediction based on data from the left side will be very different from the right side. In such cases, a linear interpolation might be as good (or bad) as more complicated linear prediction methods.

Under the space-invariant assumption, the wider the extension of the neighborhood, the better the result might be by using a linear prediction. However, the choice of the parameters M and N in the linear prediction routine described previously depends on not only the desired (or affordable) computation but also the results of aforementioned three tests. In other words, a proper filter selection step will determine whether a linear prediction for streak removal is needed, as well as what the optimal parameters used in the routine are.

Besides replacing the corrupted data, the estimation Equation (4) can be used to evaluate the discrepancy, $\epsilon(n)$, between the prediction and the actual value, as well, where $$\epsilon(n) \equiv G(n) - \tilde{G}(n) \tag{5}$$

From the theory of classical linear prediction, it is known that the mean square discrepancy $\langle\epsilon^2(n)\rangle$ can be estimated by $$\langle\epsilon^2(n)\rangle = \phi_0 - \phi_1 d_1 - \phi_2 d_2 - \ldots - \phi_M d_M \tag{6}$$

With a chosen order M and N (M<N) values in the neighborhood of a streak, at least N−M corresponding discrepancies $\langle\epsilon^2(n)\rangle$ can be estimated. By varying N and M we can determine if the space-invariant condition is satisfied and how wide the extension can be applied. Moreover, it is not difficult to prove that if the consecutive data G(n) are smooth, the first-order (M=1) mean square discrepancy should be very small:

$$\langle\epsilon^2(n)\rangle = \phi_0 - \phi_1 d_1 \tag{7}$$

One particularly good method for calculating the mean square discrepancy was originally proposed by J. P. Burg (reprinted in Childers, 1978), and involves a recursive procedure for increasing the order M by one unit at a time, at each stage re-estimating the coefficients $d_j$, j=1, . . . , M. We may use the very first recursive result $d_1$ to determine if the background is smooth enough to use a simple linear interpolation and to terminate the rest of the tests. For this purpose we define a region as "smooth" (i.e., simple linear interpolation) if $d_1$<T, where T is an open parameter that is set to be a small quantity.

Figure 7:
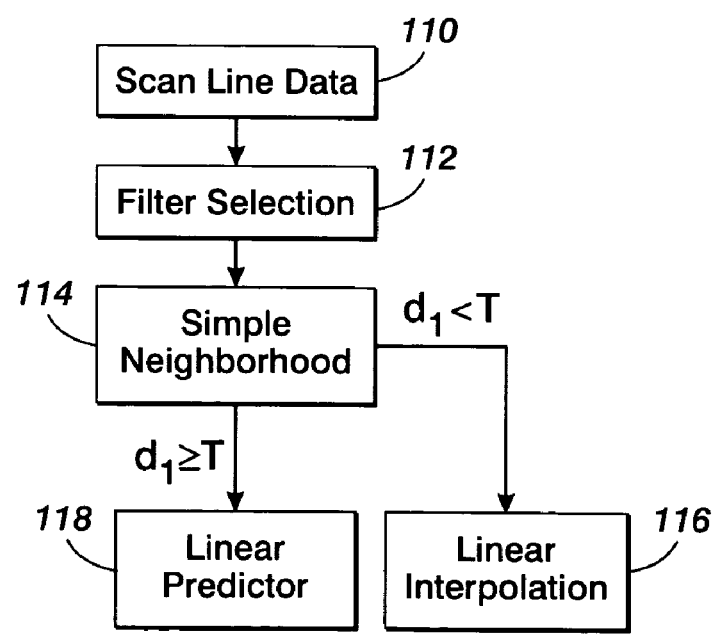
FIG. 7 is a block diagram of another method for run-time streak removal.

A method which incorporates a single coefficient $d_1$ is shown in FIG. 7. Referring to FIG. 7, in step 110, a scan line of data is provided. Step 112 is filter selection. The Burg recursive technique is used to generate the single coefficient $d_1$ and a predetermined value T is selected in step 114. If $d_1$<T, the linear interpolation is used in step 116. If $d_1 \geq T$, linear prediction is used in step 118. It should be noted that the filter selection step 112 in FIG. 7 can already be used to set some of the parameters for the Linear Prediction step 118, giving some speed advantages.

There are many possible configurations for real applications, the following routine was developed and tested for automatic streak detection and removal, however, other routines are possible and should not be taken as any limit of the method described.

Step 1. If there is a streak detected at a location in the line buffer of the scanned image, select N=64 for N consecutive values immediately to the left edge of the streak and start the discrepancy $\langle\epsilon^2(n)\rangle$ test. The highest order $M_{max}$ is always set to $M_{max=N/2}$, and a recursive evaluation is used in the test.

Step 2. If all first order discrepancies of the max N−$M_{max}$ estimations, given by equation (7), are small, quit the discrepancy test and use a linear interpolation for the streak removal.

Step 3. At any other stages of the recursive evaluation, if all M-th order discrepancies of the N−$M_{max}$ estimations given by equation (6), are small, record the current extension N and the current order M, then go to step 5.

Step 4. If none of the tests in step 3 ends with small discrepancies, reduce the extension N to N→N/2 and repeat the tests in steps 2 and 3. Continue until N<4, in which case quit the testing and use a linear interpolation for the streak removal.

Step 5. Use the saved N and M from the test by the left neighborhood of the streak, and conduct the discrepancy test with data from the right neighborhood. If the result is also with all small discrepancies, stop the test and use the saved N and M in the next step; otherwise, go back to step 4 and continue the test.

Step 6. Conduct streak removal by either linear interpolation or linear prediction based on the testing result above. If the choice is linear prediction, average the estimations using the left neighborhood and the right one for the correction.

Step 7. The determination of the "simple neighborhood" might be augmented by the data calculated on the previous scan line.

Again, the procedure described here might be modified for different applications to suit to particular system configurations. The following options have been also implemented and tested. Besides the discrepancy test, the difference of two estimations using the left and the right neighborhood may be also used for space invariance test. Instead of averaging the estimations from left and right, the one with smaller discrepancy may be used for the correction. Instead of using equation (7) in step 2, a simpler and faster "smoothness" test might be used to determine if a linear interpolation should be applied.

It is to be understood that the removal of streak data with improved data might be performed as a direct replacement; as an error correction term that is added to the image allowing original and streak removed versions to be accessed; as an alternate version of the streak/streak area using a multi-layer or multi-plane image file structure, again allowing accessing before and after version; or any other similar way.

The proposed methods have been tested with scanned images, monochrome and color, with either artificial or real streaks and produced very acceptable results in streak removal.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for run-time streak removal from a scanned image, comprising:

providing a scan line of image data from the scanned image;

detecting corrupted data within the scan line;

evaluating image data located in a neighborhood before and after the corrupted data on the scan line;

if the evaluated image data in the neighborhood is smooth, replacing the corrupted data with image data determined by a linear interpolation process; and else if the evaluated image data in the neighborhood is not smooth, replacing the corrupted data with image data determined by a linear prediction process, wherein where the scan line image data is represented by $G(i)$, where i is the coordinate of the line, where the image data from $i_1$ to $i_2$ are corrupted, where the linear prediction process comprises using M consecutive equally spaced values of the scan line image data $G(i)$, where i=1, 2, ... M, to predict an M+1st value, $G(M+1)$.

2. The method of claim 1, wherein evaluating image data located in a neighborhood before and after the corrupted data on the scan line comprises performing a filter selection process for determining whether a linear prediction for streak removal is needed, as well as for selecting optimal parameters used in the linear prediction process.

3. The method of claim 1, wherein evaluating image data located in a neighborhood, comprises:

filtering image data from the neighborhood to obtain an image output signal;

determining an error signal between the image output signal and a desired output signal;

if the error signal is less than a predetermined value, the neighborhood is substantially smooth; and if the error signal is greater than or equal to the predetermined value, the neighborhood is not substantially smooth.

4. The method of claim 1, further comprising determining if the neighborhood is spatially invariant; and if the neighborhood not spatially invariant, selecting a different replacement process for the corrupted data.

5. The method of claim 1, further comprising determining if the corrupted data is located on a boundary of two different backgrounds; and replacing the corrupted data with image data determined by the linear prediction process as applied to one of the two different backgrounds.

6. The method of claim 1, further comprising determining if the corrupted data is located on a boundary of two different backgrounds; and replacing the corrupted data with image data determined by the linear interpolation process as applied to one of the two different backgrounds.

7. The method of claim 1, where the linear interpolation process uses the immediate neighborhoods of the streak gap, $G(i_1-1)$ from the left and $G(i_2+1)$ from the right, to replace all corrupted image data $G(i)$, $i_1 \leq I \leq i_2$, by $\tilde{G}$, where $$\tilde{G} = G(i_1 - 1) + \frac{(i - i_1 + 1)}{(i_2 - i_1 + 2)} * [G(i_2 + 1) - G(i_1 - 1)].$$

8. The method of claim 1, where $G(M+1)$ can be estimated by $$\tilde{G}(n) = \sum_{j=1}^{M} d_j G(n-j)$$

where set of M linear prediction coefficients, $d_j$, can be attained from the set of M equations, $$\sum_{j=1}^{M} \phi_{|j-k|} d_j = \phi_k \quad (k = 1, \ldots, M)$$

where autocorrelation $\phi_j$ can be determined from $$\phi_j \equiv \langle G(i)G(I+j) \rangle \approx \frac{1}{N-j} \sum_{i=1}^{N-j} G(i)G(i+j).$$

9. The method of claim 8, wherein the neighborhood is spatially invariant if $\langle \epsilon^2(n) \rangle = \phi_0 - \phi_1 d_1$ are very small.

10. The method of claim 8, wherein the neighborhood is smooth if $d_1 < T$, where T is a predetermined parameter.

* * * * *